United States Patent [19]

Macon, Jr. et al.

[11] Patent Number: 5,715,455
[45] Date of Patent: Feb. 3, 1998

[54] APPARATUS AND METHOD FOR STORING FILE ALLOCATION TABLE EFFICIENTLY IN MEMORY

[75] Inventors: James Franklin Macon, Jr., Boynton Beach; David Medina, Boca Raton; Mark Alan Peloquin, Boynton Beach, all of Fla.

[73] Assignee: International Business Machines Corporation, Austin, Tex.

[21] Appl. No.: 443,829

[22] Filed: May 18, 1995

[51] Int. Cl.⁶ .................................. G06F 17/30
[52] U.S. Cl. ............ 395/621; 395/601; 395/602; 395/616; 395/828; 395/652; 360/72.1
[58] Field of Search .................. 395/600, 275, 395/608, 601, 602, 616, 828, 652; 360/72.2, 72.1

[56] References Cited

U.S. PATENT DOCUMENTS

| | | | |
|---|---|---|---|
| 4,941,059 | 7/1990 | Grant | 360/72.2 |
| 4,979,054 | 12/1990 | McCullough et al. | |
| 4,999,766 | 3/1991 | Peters et al. | |
| 5,014,237 | 5/1991 | Masters et al. | |
| 5,086,502 | 2/1992 | Malcolm | |
| 5,136,711 | 8/1992 | Hugard et al. | 395/700 |
| 5,307,497 | 4/1994 | Feigenbaum et al. | |
| 5,327,563 | 7/1994 | Singh | 395/700 |
| 5,347,651 | 9/1994 | Burke et al. | |
| 5,363,487 | 11/1994 | Willman et al. | 395/275 |
| 5,371,885 | 12/1994 | Letwin | 395/600 |
| 5,463,772 | 10/1995 | Thompson et al. | 395/600 |

OTHER PUBLICATIONS

IBM Technical Disclosure Bulletin, vol. 36 No. 7, Jul. 1993, Disk Image Book and Program Load Facility.

Technical Disclosure Bulletin, 11–72, pp. 1936–1938, Space Management Method, Nov. 1972.

IBM Technical Disclosure Bulletin, vol. 37, No. 1, Jan. 1994, Generic Device Driver for Personal Computer Removable Devices, pp. 487–499.

IBM Technical Disclosure Bulletin, vol. 34, No. 4A, Sep. 1991, Bootable Installable File System and Remote Initial Program Load Method, p. 363.

IBM Technical Disclosure Bulletin, vol. 27, No. 10B, Mar. 1985, Method for Improveing Allocation of Computer Disk File Space Based on File Size Distribution Experience, pp. 6075–6079.

IBM Technical Disclosure Bulletin, vol. 27, No. 2, Jul. 1984, DASD Storage Optimization by Sector Address Scrambling, pp. 1067–1068.

*Primary Examiner*—Thomas G. Black
*Assistant Examiner*—Cheryl Lewis
*Attorney, Agent, or Firm*—Jeffrey S. LaBaw; David H. Judson

[57] ABSTRACT

A data processing system, such as a personal computer, contains a file allocation table that is stored in memory in a packed format. During initialization, file allocation tables stored on an external storage device are "packed" and stored in a region of memory and subsequently "unpacked" during a read operation.

8 Claims, 5 Drawing Sheets

APPARATUS AND METHOD FOR STORING FILE ALLOCATION TABLE EFFICIENTLY IN MEMORY

BACKGROUND OF THE INVENTION

1. Field of the Invention

This invention relates to the field of data processing, and, more particularly, to a method and apparatus for storing a file allocation table in memory using a packed format.

2. Description of Related Art

Computer systems typically comprise a central processing unit, random access memory, read only memory, and a variety of peripheral devices such as data input devices, data output devices, and a variety of non-volatile data storage devices such as floppy disks and fixed or hard disks. Communication between the respective devices in a computer system is typically controlled by a computer operating system. One well known computer operating system is the DOS operating system available from IBM. The different versions of DOS and the different models of personal computers are well known and documented.

In the DOS operating system, a single file system describes and defines the organization of files stored on peripheral devices. In order for the computer system to read or write data in a format recognized by both the computer system and the respective peripheral devices, data must be organized in accordance with this file system. For example, in a conventional floppy disk peripheral device used with the DOS operating system, data on a floppy disk is structured in accordance with a file system, known as the file allocation table (FAT) file system which is so named because of its use of file allocation tables. The FAT file system is one of the most widely used file systems in the world today. Other file systems may be associated with other types of data storage types of peripheral devices such as tape storage devices.

File systems facilitate communication between the operating system kernel and device dependent drivers and are responsible for converting read and write commands generated by an operating system kernel into a form which may be recognized by the device driver. The DOS operating system, using the FAT, keeps track of which cluster belongs in which file—in effect, providing a map of the clusters on the external storage device. During the course of reading or writing a file, DOS checks the FAT to find all clusters associated with the file or checks the FAT for available clusters. The user only sees one file, irrespective of the number of clusters.

Due to the relative size of the FAT, it is stored on the external storage device, such as a floppy, fixed or hard disk, and accessed during each read or write operation. Due further to the fact that the relative speed at which disk devices transfer data from the device to the computer system's memory is orders of magnitude slower than the processor's ability to transfer data from one area of memory to another, accessing files not residing in memory is limited, in part, to the data transfer rate between the external storage device and the computer system's memory.

The foregoing describes in general terms the prior art being improved upon, and such prior art is also believed to be the most pertinent or relevant to the invention. However, certain patents are also known which describe inventions using bootable DOS programs stored in non-volatile memory in a packed format. U.S. Pat. No. 5,307,497—Feigenbaum et al, for DISK OPERATING SYSTEM LOADABLE FROM READ ONLY MEMORY USING INSTALLABLE FILE SYSTEM INTERFACE, discloses storing a portion of DOS in ROM in a manner different from that solved by the present invention. The present invention is directed to addressing the limitation of the data transfer rate between an external storage device and a computer system's memory. The patent is directed to initializing a computer using a DOS stored in read only memory, and to solving the problem of how to rapidly test, boot, and initialize a personal computer so that the personal computer appears to the user to "instantly" start up when the computer is turned on. Such solution differs from and does not teach the present invention.

U.S. Pat. No. 5,371,885—Letwin, HIGH PERFORMANCE FILE SYSTEM, discloses an improved file system different from the improved file system of the present invention. The present invention is directed to an improvement to the existing FAT file format. The patent is directed to a file system for organizing data using a new (HPFS) file format.

SUMMARY OF THE INVENTION

In summary, in accordance with the subject invention, for a personal computer system containing an operating system, random access memory and a file allocation table (FAT) stored in definable storage units on an external storage device, an improved structure for organizing data is disclosed using a file allocation table (FAT) stored in random access memory in a packed format having a means for grouping a first contiguous range of clusters into a first group of clusters, a means for allocating a bitmap for a given FAT storage unit, the bitmap having a bit for each cluster address within the given FAT storage unit, and a means for setting a bit in the bitmap, to indicate that certain cluster addresses within the given FAT storage unit represent an end-of-file cluster.

Accordingly, it is an object of the present invention to provide an improved file system which rapidly and efficiently locates files in a designated volume.

It is still another object of the present invention to provide an improved file system which minimizes disk utilization during data read/write operations.

BRIEF DESCRIPTION OF THE DRAWING(S)

Other objects and advantages of the invention will be apparent from the following description taken in connection with the accompanying drawings wherein.

DESCRIPTION Of THE ILLUSTRATIVE EMBODIMENT(S)

Figure 1:
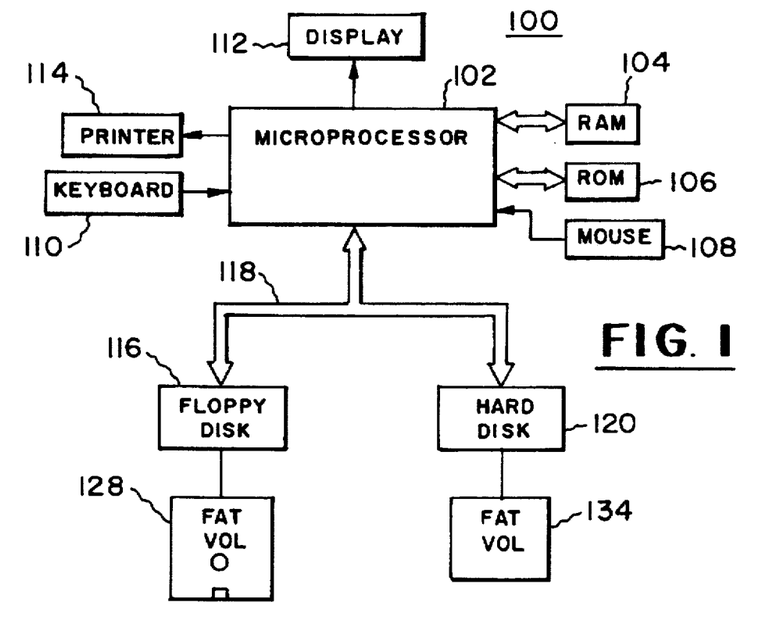
FIG. 1 is a block diagram of a data processing system constructed in accordance with the principles and embodying of the present invention.

Referring now to the drawings, FIG. 1 shows a computer system 100 which is constructed in accordance with the principles of the present invention. It is to be appreciated that such computers are complex and include many components and data processing devices, such as device controllers and adapters, which have been omitted from the drawings for simplicity of illustration. The description provided herein is limited to only those items which are useful in understanding the invention. The system 100 comprises a central processing unit or microprocessor 102, which is commercially available and functions in a known manner to execute programs stored in a random access memory (RAM) 104 and read only memory (ROM) 106.

System 100 also includes a circuit or bus network 118 operatively interconnecting the various elements of the system. A hard disk drive 120 may be formatted in accordance with a number of file systems wherein volume 134 is formatted in accordance with the FAT file system. The hard disk drive 120 includes a plurality of tracks, each track having a plurality of sectors, each sector having a plurality of storage locations. Similarly, a floppy disk drive 116 may be used with volume 128 formatted in accordance with the FAT file system.

The FAT file system is well known and is in accordance with the prior art. It is described in several publications including IBM DISK OPERATING SYSTEM TECHNICAL REFERENCE, July 1988, published by IBM to which reference may be had for a more detailed description thereof. Briefly, in a FAT file system, a disk is divided into clusters of 512 byte sectors. A file is stored in one or more clusters dependent upon the file length. The disk also contains a boot record, a file allocation table (FAT), a root directory, and a data area containing subdirectories and files. The directory is a tree structured directory system. A given file is found by specifying the drive it is on, the directory path, and a filename, e.g., c:/dir1/dir2/filename.ext.

System 100 also includes a keyboard 110 and a display 112 that allow a user to respectively input data and commands into the system and view output from the system. A mouse 108 and the floppy diskette drive 116 are connected to the bus 118. A switch (not shown) is connected between a power source (not shown) and a power supply (not shown) that distributes electrical power to the various components of system 100 through power distribution lines included in bus network 118. The switch is selectively actuated or operated to power or turn system 100 on and off. When the switch is initially turned on, display 112 warms up within a relatively short period and the ROM based booting and system initialization, described in detail below occurs within the period required for the display to warm up so that at the end of such period, the display 112 screen becomes visible to the user. In the FAT file system structure of the prior art DOS operating system, the FAT file system is embedded in the operating system kernel. A file allocation table associated with a particular external storage device is stored on the external storage device as, for example, volumes 128, 134.

In the DOS environment, floppy disks are referred to as volumes. Fixed disks (or hard disks) may be partitioned into multiple volumes. This terminology applies to the present invention as well. Briefly, whenever the system 100 is first booted, whenever a volume is first accessed, or whenever the system determines uncertain media is present in disk device 120, the system examines the file system driver.

Figure 2:
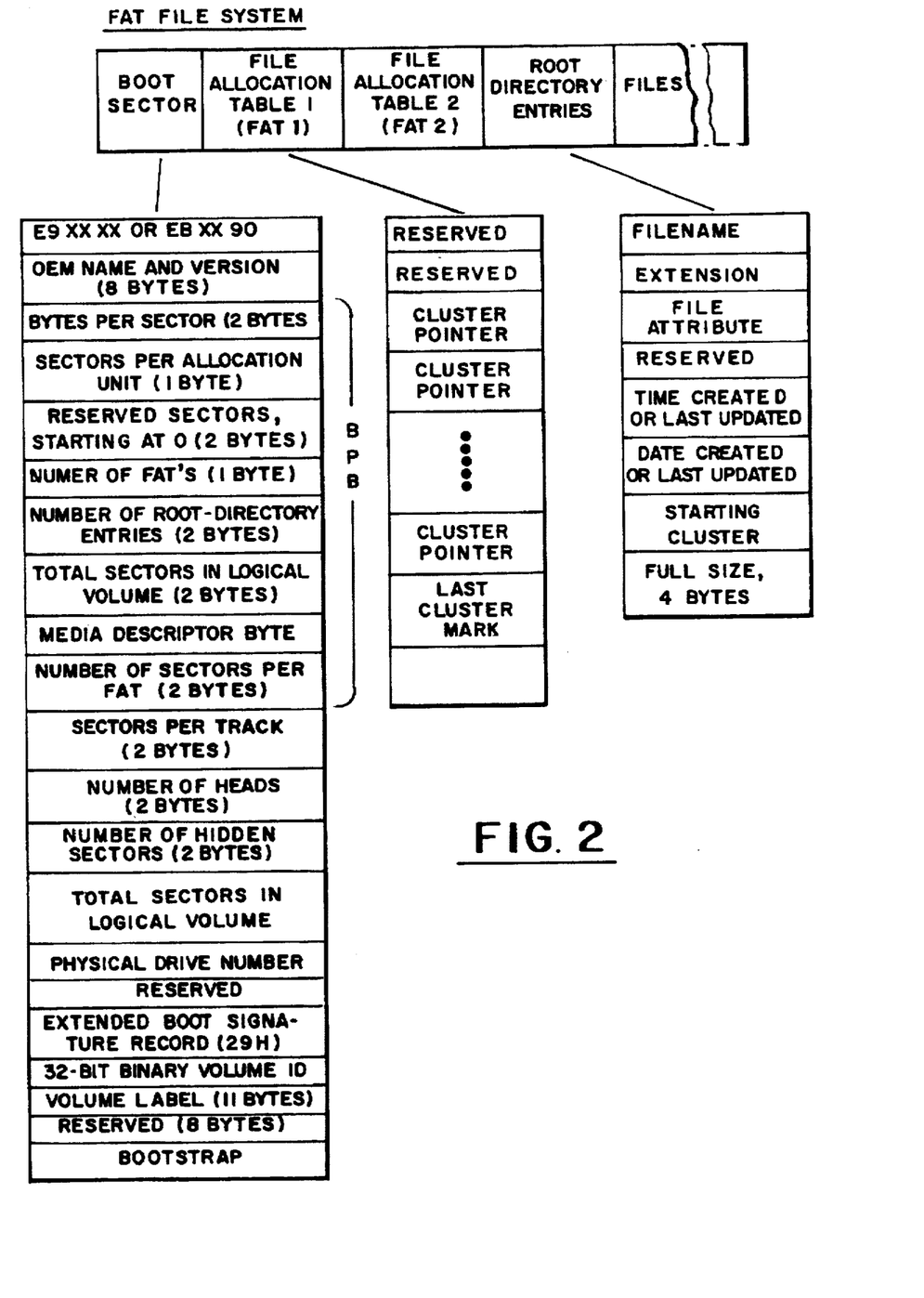
FIG. 2 is a diagram showing the disk format of the FAT file system stored in definable storage units on an external storage device.

FIG. 2 is a diagram of the disk format of the FAT file system. A brief description of the FAT file system follows. The FAT file system revolves around the File Allocation Table. Each logical volume is associated with its own FAT, which serves two important functions: it contains the allocation information for each file on the volume in the form of linked lists of allocation units and it indicates which allocation units are free for assignment to a file that is being created or extended.

When a disk is formatted in accordance with the FAT file system, a boot sector is written in sector zero. This is followed by one or more file allocation tables. Each file allocation table is physically located on one or more definable FAT storage units of the external storage media. Although the definable FAT storage unit is typically a 512 byte sector on the external disk storage device for the illustrative embodiment, it is understood that the size of the FAT storage unit may be greater or less than 512 bytes. The file allocation tables are followed by a root directory. The root directory is followed by the volume files. The boot sector contains various descriptive information about the volume in an area referred to as the boot parameter block or BPB, information such as a drive number and a volume I.D., the number of sectors per FAT, as well as a bootstrap routine.

The file allocation table is divided into fields that correspond directly to the assignable clusters on a disk (clusters are represented as power-of-2 multiples of sectors). These fields are typically 16 bits wide. The first two FAT entries are reserved and the remaining FAT entries describe the use of their corresponding disk clusters. Each file's entry in a directory contains the number of the first cluster assigned to that file, which is used as an entry point into the FAT. From the entry point on, each FAT slot contains the number of the next cluster in the file, until an end-of-cluster mark is encountered. The FAT file system also provides for the option of maintaining a duplicate of the first file allocation table which may be used if access to a sector in the FAT fails due to a read error, etc.

Following the file allocation tables, is the root directory. The root directory contains 32 byte entries that describe files, other directories, and an optional volume label.

The remainder of the volume after the root directory is known as the files area which may be viewed as pools of clusters, each containing one or more logical sectors. Each cluster has a corresponding entry in the FAT that describes its current use: available, reserved, assigned to a file, or unusable. In the illustrative embodiment, 0x0000 signifies an available cluster, 0xFFFF signifies an end-of-cluster chain, and 0xFFF7 signifies an unusable or bad cluster (where 0x indicates a HEX value). Any cluster between 0xFFF8 and 0xFFFE is considered invalid. The FAT thus consists of a number of clusters that represent data addresses on the media.

The first cluster value of a file or directory is located in the directory entry. A directory/subdirectory is a place in the FAT format where directory entries are stored. There is one root directory and possibly many subdirectories. The number of root directories is defined in the boot sector and, in the illustrative embodiment, is equal to 512 entries. In addition, the root directory is the root of all files/subdirectories. Subdirectories allow the user to place files or other subdirectories that are related to a specific category and allow operating system commands such as copy, move, and delete or application programming interfaces (API's) to apply to the whole subdirectory. A directory entry describes a file/subdirectory. It contains the starting cluster number, file name, attribute, size, time stamp, and other information.

If a file or subdirectory requires more than one cluster then clusters are chained or "linked" together. For example, if a cluster size was 2048 bytes (512 bytes/sector*4 sectors) and a file had a size of 4096 bytes, then it would require 2 clusters (4096/2048) to represent the file.

According to the illustrative embodiment of the invention, three data patterns may exist in the FAT format:

1. A contiguous run of allocated clusters. For example, if a file has a starting cluster of 9 and an ending cluster of 105, the cluster position 9 in the FAT contains 10, the cluster position 10 in the FAT contains 11, and so one, up to cluster position 105 which contains the 0xFFFF—the end-of-file cluster value.
2. A contiguous run of free clusters. For example, if the above file would be deleted, then the cluster positions 9 through 105 would contain 0x0000—the free cluster value.
3. A contiguous run of bad clusters. For example, sections on the disk tend to be bad in groups rather than in isolated instances of a single bad cluster and each cluster position for such groups would contain 0xFFF7—the bad cluster value.

The FAT file system provides excellent performance with volumes which are less than 1 Mb. However, as volumes increase in size over 1 Mb, the performance of the FAT file system quickly degrades. This has become an increasingly severe problem as the size of readily available hard disks is rapidly increasing.

When volumes are less than 1 Mb, the FAT is small enough to be retained in random access memory 104 at all times, thus allowing very fast random access to any part of a file. When applied to hard disks or fixed disks, however, the FAT becomes too large to hold in memory and must be paged into memory in pieces. This results in many superfluous disk head movements, thus degrading system throughput. Furthermore, the use of relatively large clusters on hard disks results in much wasted space.

The present invention overcomes the above mentioned problems by storing file allocation table in RAM 104 in a packed format in the system architecture shown in FIG. 1. The present invention takes advantage of the characteristic that contiguous ranges of clusters within the FAT format may be represented as single groups of contiguous clusters. For a personal computer system containing an operating system, random access memory and a file allocation table (FAT) stored in definable storage units on an external storage device, the present invention provides an improved structure and means for organizing data using a file allocation table (FAT) stored in random access memory in a packed format by grouping a first contiguous range of clusters into a first group of clusters, allocating a bitmap for a given FAT storage unit, the bitmap having a bit for each cluster address within the given FAT storage unit, and setting a bit in the bitmap, to indicate that certain cluster addresses within the given FAT storage unit represents an end-of-file cluster.

This arrangement provides several advantages over the prior art. In the prior art embodiment, for example, before data can be read from an external storage device, the contents of the FAT must be consulted in order to determine the location of data. Since FAT itself resides on the external storage device along with data, multiple I/O's are required to retrieve data from the external storage device. That is, a first I/O operation being performed when consulting FAT entries followed by a subsequent I/O operation when accessing the data itself. By storing FAT in a packed format in memory, FAT data residing on the external storage device need not be accessed by way of an I/O operation prior to retrieving data. Rather, data may be accessed on the external storage device based on mapping information available in the in-memory FAT. As a result, data is more quickly accessed. Moreover, although the FAT may be stored in memory in an unpacked format, doing so lends itself to an inefficient use of memory. Thus, storing FAT in a packed format offers the further advantage of efficient memory utilization.

As in the prior art embodiment, the FAT file system according to the present invention revolves around the File Allocation Table. According to the present invention however, a packed version of the FAT serves two important functions: it contains the allocation information for each FAT storage unit in the form of a count of contiguous clusters within a single group of clusters, and it indicates which allocation units are free for assignment to a file that is being created or extended.

Figure 3:
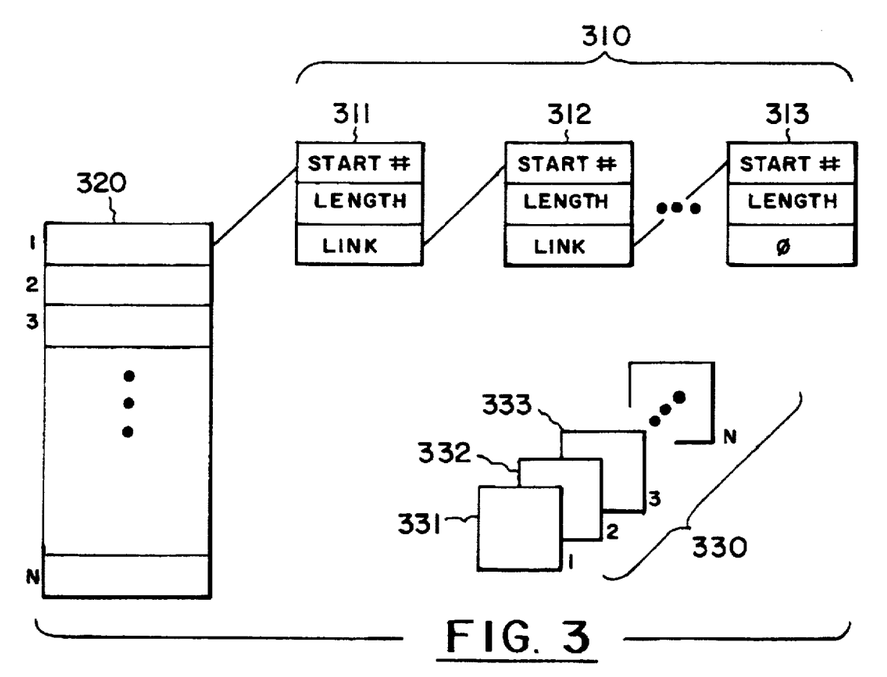
FIG. 3 is a diagram showing the disk format of the FAT file system embodying the present invention.

Referring to FIG. 3, for the in-memory FAT of the present invention, a given FAT storage unit is represented as one or more groups of packed records 310, wherein an array 320 of pointers serves as a directory of entries for pointing to a first packed record 311 for any given FAT storage unit and wherein a contiguous range of clusters is represented by the packed record. In the illustrative embodiment, each packed record is comprised of a starting cluster number, a count of contiguous clusters, and a pointer to a subsequent group of clusters, if any. Moreover, a bitmap 330 is allocated for each definable FAT storage unit, wherein each bitmap contains a bit for each cluster address within a given FAT storage unit, to indicate whether any given cluster comprises an end-of-file cluster.

Inasmuch as the present invention takes advantage of the characteristic that contiguous ranges of clusters within the FAT format may be represented as single groups of clusters in a packed format, special cluster representations impose a practical limitation to such compressed format. For example, when designating an end to a linked list of chained of cluster addresses, the end-of-cluster value 0xFFFF presents one such practical limitation. Because any cluster between 0xFFF8 and 0xFFFE is considered an invalid cluster address, 0xFFFF would always represent a non-contiguous address within any contiguous range of clusters. Moreover, because adjacent contiguous ranges of clusters may otherwise be concatenated as a single group of clusters, an end-of-cluster value (which is not logically the next value within a contiguous range of clusters) imposes a further limitation to adjacent contiguous ranges of clusters.

In a prior art embodiment for example, assume file A uses clusters 3,4,5. The directory entry for file A would contain 3. Cluster position 3 in the FAT would contain 4; cluster position 4 in the FAT would contain 5; and cluster position 5 in the FAT would contain 0xFFFF. If file B uses clusters 6,7,8 then the directory entry for file B would contain 6. Cluster position 6 in the FAT would contain 7; cluster position 7 in the FAT would contain 8; and cluster position 8 in the FAT would contain 0xFFFF. The FAT fragment for these files would appear as:

0004 0005 FFFF 0007 0008 FFFF

Accordingly, the contiguous ranges of allocated clusters in the above example is no more than two (0004 0005, and 0007 0008). The present invention provides a method and means of assigning a pseudo cluster value to an end-of-file cluster, where the pseudo cluster value is equal to the next logical address within a contiguous range of allocated clusters. In the above example, therefore, the first end-of-file cluster could be considered cluster 0006 and the second end-of-file cluster could be considered 0009. The fragment would then logically appear as:

0004 0005 0006 0007 0008 0009

Once represented in a packed form, the amount of memory needed to represent the contiguous range of clusters consists of a record which contains the starting cluster number, count of contiguous clusters, and link to the next record. Records are linked together because more than one record may be required to represent a FAT storage unit. The record for the fragment in the above example would contain 0004 as the starting cluster, 6 as the count of contiguous clusters, and xxxx as the link to the next record. The compression ratio increases as the length of contiguous ranges increases and as adjacent ranges are linked by pseudo clusters, wherein the pseudo cluster value is equal to the next logical address within a contiguous range of clusters.

While referencing data using pseudo clusters and a packed format FAT, the value of each bit within a corresponding bitmap 330 is checked. For those cluster addresses where its corresponding bit is set, the value of the cluster address is taken to be that of an end-of-file cluster, notwithstanding the fact that cluster may appear to be one cluster within a contiguous range of allocated clusters.

The first time a request is made to read a FAT storage unit, initialization will take place which includes reading each FAT storage unit into memory and applying the packing function to the FAT storage units. The packing function builds a list of records and end-of-file bit maps as described above. An array 320 is allocated to store pointers to the first record of each FAT storage unit.

Figure 4:
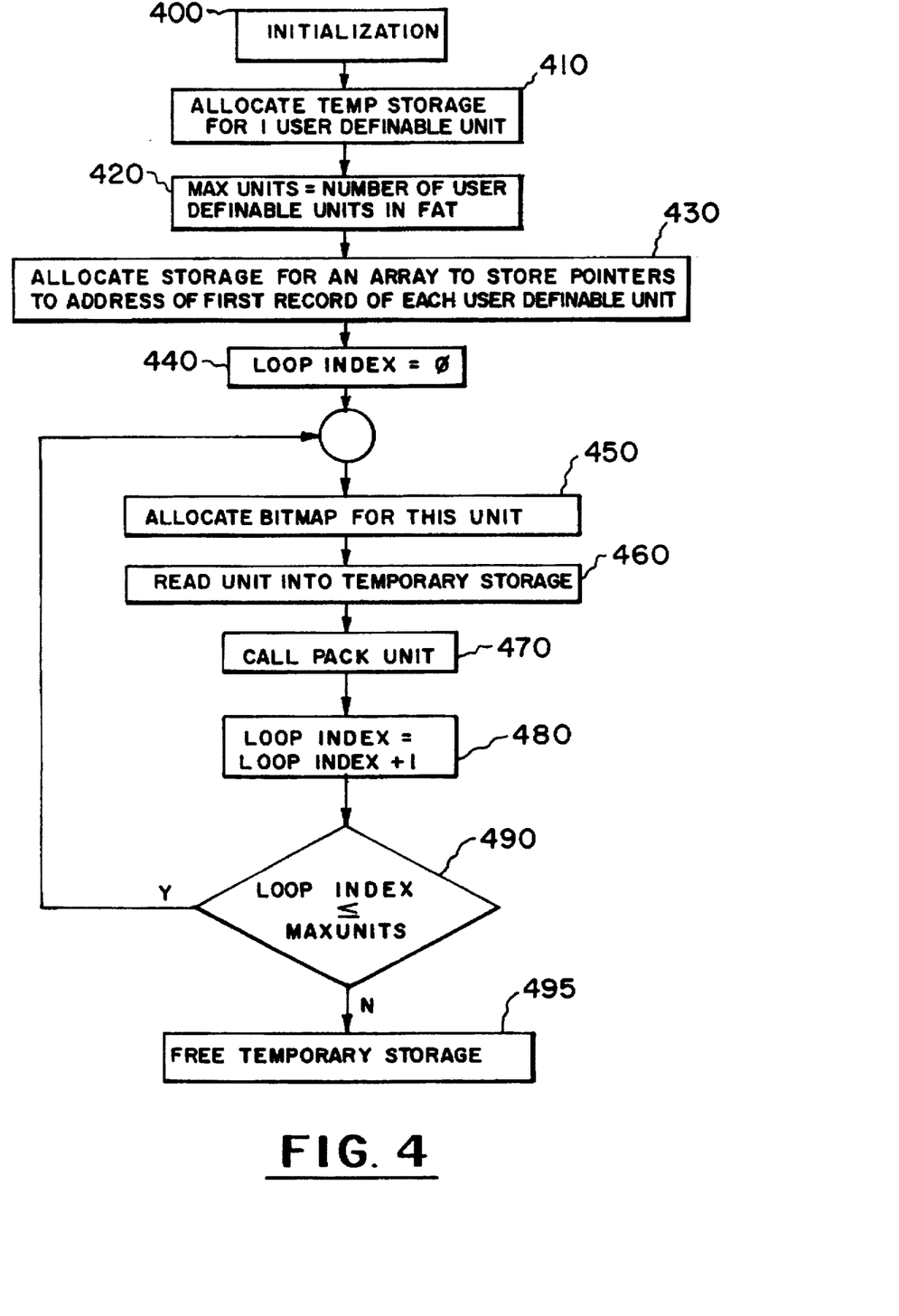
FIG. 4 is a flow diagram illustrating an initialization routing according to the present invention.

Referring now to FIG. 4, the explanation will now proceed to the initialization of the FAT file system and to the operation of storing the FAT in memory in a packed format. The coding of steps as described into instructions suitable to control the system processor will be understood to one having ordinary skill in the art of programming. The process begins at 410, where an area of temporary storage is allocated in memory 104 for a FAT storage unit. The process then continues at 420 where the number of FAT storage units for a given FAT is set as the value of a limit counter MAXUNITS. Storage is also allocated in memory 104, at 430, to store an array 320 of pointers which serves as a directory of entries for pointing to the address of a first group of clusters for any given FAT storage unit. A LOOPINDEX counter is next set to zero at 440. Continuing with the description of FIG. 4, a bitmap 330 is allocated for the given FAT storage unit at 450; the given FAT storage unit is read into temporary storage at 460; and the given FAT storage unit is packed at 470. LOOPINDEX is then incremented at 480, and LOOPINDEX is compared to MAXUNITS at decision 490. In the event that LOOPINDEX is less than or equal to MAXUNITS, other FAT storage units have not been yet read and packed, the YES branch loops back to 450. In the event that LOOPINDEX is greater than MAXUNITS, all FAT storage units for the given FAT storage unit have been read and packed, the NO branch is taken to 495, where the system frees temporary storage allocated in 410.

Figure 5:
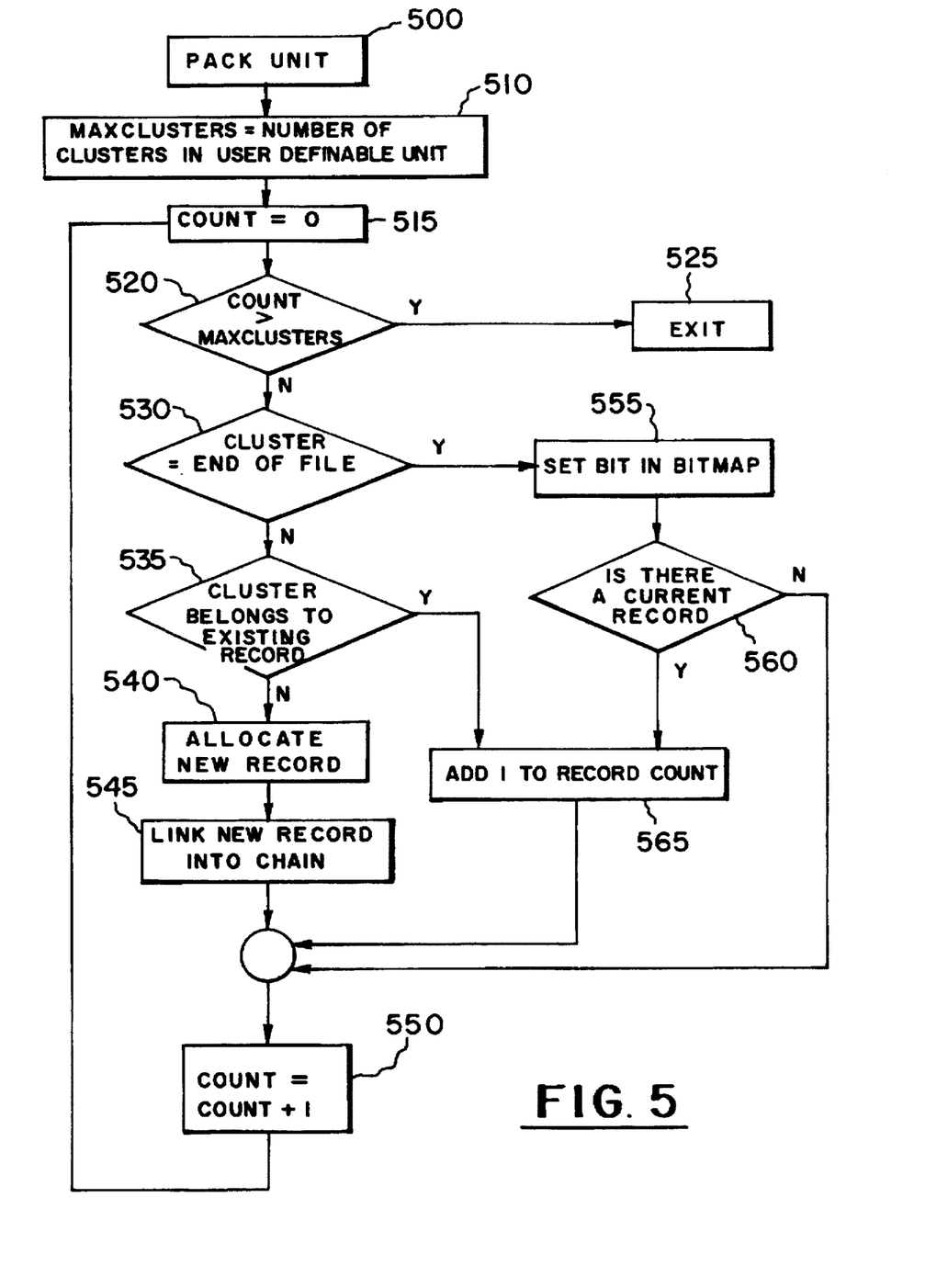
FIG. 5 is a flow diagram illustrating the method of packing the FAT according to the present invention.

Referring to FIG. 5, the explanation will now proceed to the packing of the FAT. The coding of steps as described into instructions suitable to control the system processor will be understood to one having ordinary skill in the art of programming. The process begins at 510 and 515, where various parameters are initialized, including: MAXCLUSTERS being set to the number of clusters in a particular FAT storage unit; and COUNT being set to zero. At decision block 520, the value of COUNT is compared to the value of MAXCLUSTERS. If the value of COUNT is greater than MAXCLUSTERS, the YES branch is taken to 525, where the pack procedure exits; otherwise, the NO branch is taken to decision block 530. At decision block 530, the value of a given cluster is compared to the value of the end-of-file cluster (0xFFFF). If the values are not equal the NO branch serves as further input to decision block 535, where the given cluster is checked as belonging to an existing record. If the given cluster does not belong to an existing record, the NO branch is taken to 540, where a new record is allocated. The newly created record comprises a starting cluster number, a record count of contiguous clusters, and a link to a subsequent record, if necessary. Thereafter, at 545, the newly created record is linked into a chain, or linked list, of existing records. It is to be understood that a first record is linked to the array 320 of pointers which serves as a directory of entries for pointing to the address of a first group of clusters for any given FAT storage unit. Referring back again to decision block 530, if the value of the given cluster is equal to the end-of-file cluster, the YES branch is taken to 555, where a bit corresponding to the given cluster is set in a bitmap 330 corresponding to the given FAT storage unit. Thereafter, decision block 560 checks whether a current record exits. If no current record exists, the NO branch is taken to 550, where COUNT is incremented by one; otherwise, the YES branch is taken to 565, where the length of the existing record is incremented by one before proceeding to block 550, where COUNT is incremented by one. Finally, 550 serves as further input to decision block 520, where the cycle continues or exits.

Figure 6:
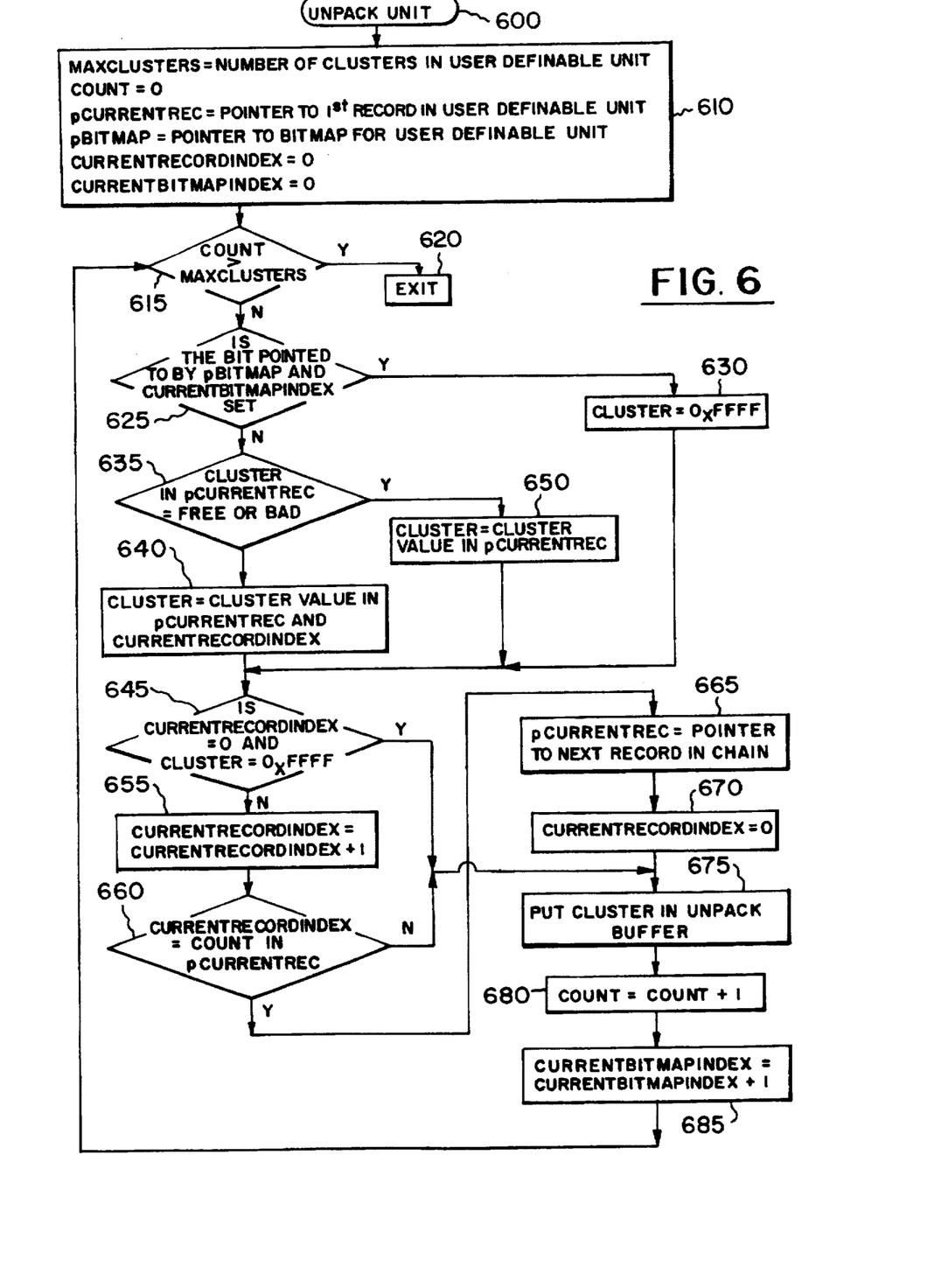
FIG. 6 is a flow diagram illustrating the method of unpacking the FAT according to the present invention.

After initialization, a request to read a FAT storage unit can be replaced by an unpack function which converts the FAT storage unit information stored as packed records and the end-of-file bitmap into an unpacked form. Referring therefore now to FIG. 6, the explanation will now proceed to the unpacking of the FAT. The coding of steps as described into instructions suitable to control the system processor will be understood to one having ordinary skill in the art of programming. The process begins at 610, where various parameters are initialized, including: MAXCLUSTERS being set to the number of clusters in a particular FAT storage unit; COUNT is set to zero; pCurrentRec is defined as a pointer to the first record in the FAT storage unit; pBitmap is defined as a pointer to a bitmap for a given FAT storage unit; Current Record Index is set to zero; and Current Bitmap Index is set to zero. At decision block 615, the value of COUNT is compared to MAXCLUSTERS. In the event that COUNT is greater than MAXCLUSTERS, the YES branch is taken to 620 to exit the unpack function; otherwise, the NO branch is taken to serve as input to decision block 625. Decision block 625 examines whether the value of the bit at the position defined by the value of pBitmap+Current Bitmap Index is set. If set, the YES branch is taken where 630 assigns the value of the current cluster address at 0xFFFF, the end-of-file cluster value; otherwise the NO branch is taken to decision block 635. At decision block 635, the current cluster address is examined as constituting a free (0x0000) or bad cluster (0xFFF7). If the given cluster is neither free nor bad, the NO branch is taken to 640, where the Current Record Index is incremented by one. Thereafter, decision block 645 compares whether the value of Current Record Index is zero and the value of the given cluster is that of an end-of-file cluster (0xFFFF). Referring back to decision block 635, in the event that the YES branch is taken to 650, the value of the given cluster is taken to be the cluster value at the address designated by pCurrentRec; with output of 650 likewise serving as input to decision block 645. If the value of the Current Record Index is not zero and/or the value of the given cluster is not an end-of-file cluster (0xFFFF), the NO branch of decision block 645 is taken to serve as input to 655, where the value of Current Record Index is incremented by one. Thereafter, the Current Record Index is compared to the value of pCurrentRec at decision block 660. If equal, the YES branch is taken to 665, where pCurrent is set to the value of the next pointer in the chain, or linked list of packed records. Next, the Current Record Index is set to zero at step 670. Referring back now to decision blocks 645 and 660, if the YES branch of decision block 645 is taken, the NO branch of decision block 660, each serve as input, along with block 670, to step 675, where the cluster is added to an unpack buffer. Finally, COUNT and Current Bitmap Index are each incremented by one at 680 and 685, respectively, before looping back to decision block 615.

A request to write a FAT sector to disk must first delete the records for that sector and build a new list of records based on the modified FAT sector. As an alternative, an existing FAT sector may be updated with any changes to the existing FAT sector made subsequent to an earlier read operation.

In summary, an improved file allocation table (FAT) system has been described. According to the principles of the present invention, an improved structure for organizing data is disclosed using a file allocation table (FAT) stored in random access memory in a packed format wherein a bitmap contains a bit for each cluster address within a FAT sector, a means for setting a bit in the bitmap for such FAT sector that contain an end-of-file cluster to indicate that the cluster represents an end-of-file cluster, and a means for assigning a pseudo cluster value for certain clusters.

It should be apparent to those skilled in the art that many changes can be made in the details and arrangements of steps and parts without departing from the scope of the invention as defined in the appended claims.

What is claimed is:

1. In a personal computer system comprising an operating system, random access memory (RAM) and a file allocation table (FAT) normally stored in definable FAT storage units on an external storage device, wherein the file allocation table represents a mapping of data stored on the external storage device having a plurality of tracks, each track having a plurality of sectors, each sector having a plurality of storage locations, wherein one or more sectors may be represented by a single cluster, the improvement comprising:

means for storing said file allocation table in a packed format in the RAM of the personal computer such that, during an I/O operation, the external storage device need not be accessed to retrieve entries from the file allocation table;

means for grouping a first contiguous range of clusters into a first group of clusters;

means for allocating a bitmap for a given FAT storage unit, said bitmap having a bit for each cluster address within said given FAT storage unit; and means for setting a bit in said bitmap, to indicate that certain ones of said cluster addresses within said given FAT storage unit represent an end-of-file cluster.

2. The improvement of claim 1 further comprising:

means for linking said first contiguous group of clusters to a subsequent group of cluster.

3. The improvement of claim 1 further comprising:

means for assigning a pseudo cluster value for certain ones of said clusters wherein said pseudo cluster value represents a logical address within a contiguous range of clusters on said external storage device.

4. In a personal computer system comprising an operating system, random access memory (RAM) and a file allocation table (FAT) normally stored in definable FAT storage units on an external storage device, wherein the file allocation table represents a mapping of data stored on the external storage device having a plurality of tracks, each track having a plurality of sectors, each sector having a plurality of storage locations, wherein one or more sectors may be represented by a single cluster, the improvement comprising:

means for storing said file allocation table in a packed format in the RAM of the personal computer such that, during an I/O operation, the external storage device need not be accessed to retrieve entries from the file allocation table;

means for assigning a pseudo cluster value for certain ones of said clusters wherein said pseudo cluster value represents a logical address within a contiguous range of clusters on said external storage device;

means for grouping a first contiguous range of clusters into a first group of clusters;

means for linking said first contiguous group of clusters to a subsequent group of clusters;

means for allocating a bitmap for a given FAT storage unit, said bitmap having a bit for each cluster address within said given FAT storage unit; and means for setting a bit in said bitmap, to indicate that certain ones of said cluster addresses within said given FAT storage unit represent an end-of-file cluster.

5. A method in a computer system for storing a file allocation table (FAT) in a packed format in a random access memory of the computer system, wherein the file allocation table represents a mapping of data stored on an external storage device having a plurality of sectors, each sector having a plurality of storage locations, wherein one or more sectors may be represented by a single cluster, the method comprising the steps of:

grouping a first contiguous range of clusters into a first group of clusters;

allocating a bitmap for a given FAT storage unit, said bitmap having a bit for each cluster address within said given FAT storage unit; and setting a bit in said bitmap, to indicate that certain ones of said cluster addresses within said given FAT storage unit represent an end-of-file cluster.

6. The method of claim 5 further comprising the step of:

linking said first contiguous group of clusters to a subsequent group of clusters.

7. The method of claim 5 further comprising the step of:

assigning a pseudo cluster value for certain ones of said clusters wherein said pseudo cluster value represents a logical address within a contiguous range of clusters on said external storage device.

8. A method in a computer system for unpacking a file allocation table (FAT) stored in a packed format in a random access memory of the computer system, wherein the file allocation table represents a mapping of data stored on an external storage device having a plurality of sectors, each sector having a plurality of storage locations, wherein one or more sectors may be represented by a single cluster, the method comprising the steps of:

assigning a pseudo cluster value for certain ones of said clusters wherein said pseudo cluster value represents a logical address within a contiguous range of clusters on said external storage device;

grouping a first contiguous range of clusters into a first group of clusters;

linking said first contiguous group of clusters to a subsequent group of clusters;

allocating a bitmap for a given FAT storage unit, said bitmap having a bit for each cluster address within said given FAT storage unit; and setting a bit in said bitmap, to indicate that certain ones of said cluster addresses within said given FAT storage unit represent an end-of-file cluster.

\* \* \* \* \*